US011104228B2

(12) United States Patent
Ishibashi et al.

(10) Patent No.: US 11,104,228 B2
(45) Date of Patent: Aug. 31, 2021

(54) IN-VEHICLE EQUIPMENT CONTROL SYSTEM

(71) Applicant: Yazaki Corporation, Tokyo (JP)

(72) Inventors: Shuichi Ishibashi, Shizuoka (JP); Jun Goto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 123 days.

(21) Appl. No.: 15/667,915

(22) Filed: Aug. 3, 2017

(65) Prior Publication Data

US 2018/0043777 A1  Feb. 15, 2018

(30) Foreign Application Priority Data

Aug. 12, 2016 (JP) .............................. JP2016-158838

(51) Int. Cl.
*B60K 35/00* (2006.01)
*B60W 50/04* (2006.01)
*B60R 11/00* (2006.01)
*B60W 50/00* (2006.01)

(52) U.S. Cl.
CPC ........... *B60K 35/00* (2013.01); *B60W 50/045* (2013.01); *B60R 2011/0028* (2013.01); *B60W 2050/0001* (2013.01); *G05B 2219/2637* (2013.01)

(58) Field of Classification Search
CPC ................ B60K 35/00; B60W 50/045; B60W 2050/0001; B60R 2011/0028; G05B 2219/2637
See application file for complete search history.

(56) References Cited

U.S. PATENT DOCUMENTS

| 6,504,262 | B1 | 1/2003 | Aoki et al. |
| 9,511,730 | B1 * | 12/2016 | Wu ................... G06K 9/00845 |
| 9,656,603 | B2 | 5/2017 | Sugimoto et al. |
| 2004/0095366 | A1 * | 5/2004 | Kawai ................ B60K 35/00 715/700 |

(Continued)

FOREIGN PATENT DOCUMENTS

| CN | 105818736 A | 8/2016 |
| JP | 2001-122055 A | 5/2001 |
| JP | 2005-81861 A | 3/2005 |

OTHER PUBLICATIONS

Japanese Office Action for the related Japanese Patent Application No. 2016-158838 dated Jul. 17, 2018.

*Primary Examiner* — Behrang Badii
*Assistant Examiner* — Daniel L Greene
(74) *Attorney, Agent, or Firm* — Kenealy Vaidya LLP

(57) ABSTRACT

An in-vehicle equipment control system includes a ceiling side controller installed in a ceiling of a vehicle and configured to control equipment installed at least in the ceiling; and a vehicle internal communication device configured to enable the ceiling side controller and a lower side controller to transmit and receive information signals to and from each other, the lower side controller having been installed in a part lower than the ceiling. The ceiling side controller is capable of receiving ceiling side detection signals regarding pieces of ceiling side detection information detected by at least one ceiling side detection device in the ceiling, as ceiling side information signals regarding pieces of ceiling side information, from the at least one ceiling side detection device.

7 Claims, 3 Drawing Sheets

(56) References Cited

U.S. PATENT DOCUMENTS

| | | | |
|---|---|---|---|
| 2006/0164230 A1* | 7/2006 | DeWind | B60K 35/00 |
| | | | 340/461 |
| 2011/0148141 A1* | 6/2011 | Pfertner | B60J 7/043 |
| | | | 296/180.3 |
| 2013/0285549 A1* | 10/2013 | Aoki | B60Q 3/80 |
| | | | 315/79 |
| 2015/0282280 A1* | 10/2015 | Sugimoto | H05B 45/20 |
| | | | 315/77 |
| 2016/0214530 A1 | 7/2016 | Sugimoto et al. | |
| 2017/0118816 A1* | 4/2017 | Ohashi | H05B 45/24 |
| 2017/0144597 A1* | 5/2017 | Wu | B60Q 9/008 |
| 2017/0349098 A1* | 12/2017 | Uhm | B60K 35/00 |

\* cited by examiner

IN-VEHICLE EQUIPMENT CONTROL SYSTEM

CROSS-REFERENCE TO RELATED APPLICATION(S)

The present application claims priority to and incorporates by reference the entire contents of Japanese Patent Application No. 2016-158838 filed in Japan on Aug. 12, 2016.

BACKGROUND OF THE INVENTION

1. Field of the Invention

The present invention relates to an in-vehicle equipment control system.

2. Description of the Related Art

Conventionally, an in-vehicle equipment control system configured to control various pieces of equipment mounted on a vehicle has been known (Japanese Patent Application Laid-open No. 2001-122055). In this in-vehicle equipment control system, a control device supplies power or transmits an information signal (a control signal or a detection signal) to equipment under operational control, and controls the equipment based on the power or the information signal, for example.

Apart from such a system, equipment (for example, a light and a communication device) to be put under operational control (such as operational control necessitated by control on power supply, and operational control corresponding to a command value for a controlled variable) is installed in the ceiling in addition to other parts in a vehicle. The number of pieces of equipment installed in the ceiling has been increasing in recent years. In the conventional in-vehicle equipment control system, equipment installed in the ceiling is controlled by a control device installed in a place (in a part, such as a floor panel or an engine compartment, of the vehicle that is lower than the ceiling) different from a place in which the equipment is installed. In the conventional in-vehicle equipment control system, the operation of equipment installed in the ceiling is controlled in a manner such that information from components in the ceiling such as the equipment and detection devices is first transmitted to the control device in the lower part of the vehicle, and information on results of arithmetic processing using the transmitted information is transmitted by the control device to the equipment in the ceiling. Thus, while having equipment to be put under operational control installed in the ceiling, the conventional in-vehicle equipment control system may need exchanging information between the ceiling part and the lower part of the vehicle. This condition presumably makes the control complicated.

SUMMARY OF THE INVENTION

Given this situation, the present invention is aimed at providing an in-vehicle equipment control system that enables simplified control.

An in-vehicle equipment control system according to one aspect of the present invention includes a ceiling side controller installed in a ceiling of a vehicle and configured to control an equipment provided at least to the ceiling; and a vehicle internal communication device configured to enable the ceiling side controller and a lower side controller to transmit and receive information signals to and from each other, the lower side controller having been installed in a lower side of the vehicle than the ceiling of the vehicle, wherein the ceiling side controller is capable of receiving ceiling side detection signals regarding pieces of ceiling side detection information detected by at least one ceiling side detection device in the ceiling, as ceiling side information signals regarding pieces of ceiling side information, from the at least one ceiling side detection device and capable of receiving lower side detection information detected by at least one lower side detection device in the lower side of the vehicle, as lower side information signals regarding pieces of lower side information, from the at least one lower side detection device via the vehicle internal communication device, and the ceiling side controller uses information to control the equipment that is to be controlled, the information being information included among at least one of the pieces of ceiling side information and at least one of the pieces of lower side information and needed for controlling the equipment.

An in-vehicle equipment control system according to another aspect of the present invention includes a ceiling side controller installed in a ceiling of a vehicle and configured to control an equipment provided at least to the ceiling; a lower side controller installed in a lower side of the vehicle than the ceiling of the vehicle; and a vehicle internal communication device configured to enable the ceiling side controller and the lower side controller to transmit and receive information signals to and from each other, wherein the ceiling side controller is capable of receiving ceiling side detection signals regarding pieces of ceiling side detection information detected by at least one ceiling side detection device in the ceiling, as ceiling side information signals regarding pieces of ceiling side information, from the at least one ceiling side detection device and capable of receiving lower side detection information detected by at least one lower side detection device in the lower side of the vehicle, as lower side information signals regarding pieces of lower side information, from the at least one lower side detection device via the vehicle internal communication device, and the ceiling side controller uses information to control the equipment that is to be controlled, the information being information included among at least one of the pieces of ceiling side information and at least one of the pieces of lower side information and needed for controlling the equipment.

According to still another aspect of the present invention, in the in-vehicle equipment control system, it is preferable that the ceiling side controller is capable of retaining, as one of the pieces of ceiling side information, a piece of ceiling side equipment information regarding at least one of equipment that has been installed in the ceiling and capable of receiving lower side equipment information regarding at least one of equipment that has been installed in the lower part of the vehicle, as one of the lower side information signals regarding the pieces of lower side information, from the lower side controller via the vehicle internal communication device.

According to still another aspect of the present invention, in the in-vehicle equipment control system, it is preferable that when the lower side controller controls any one of the at least one equipment that has been installed in the lower side of the vehicle, the ceiling side controller transmits any one piece of the pieces of ceiling side information to the lower side controller via the vehicle internal communication device, the one piece of ceiling side information being needed for the control.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment of an in-vehicle equipment control system according to the present invention in detail based on the drawings. This embodiment is not intended to limit this invention.

Embodiment

Figure 1:
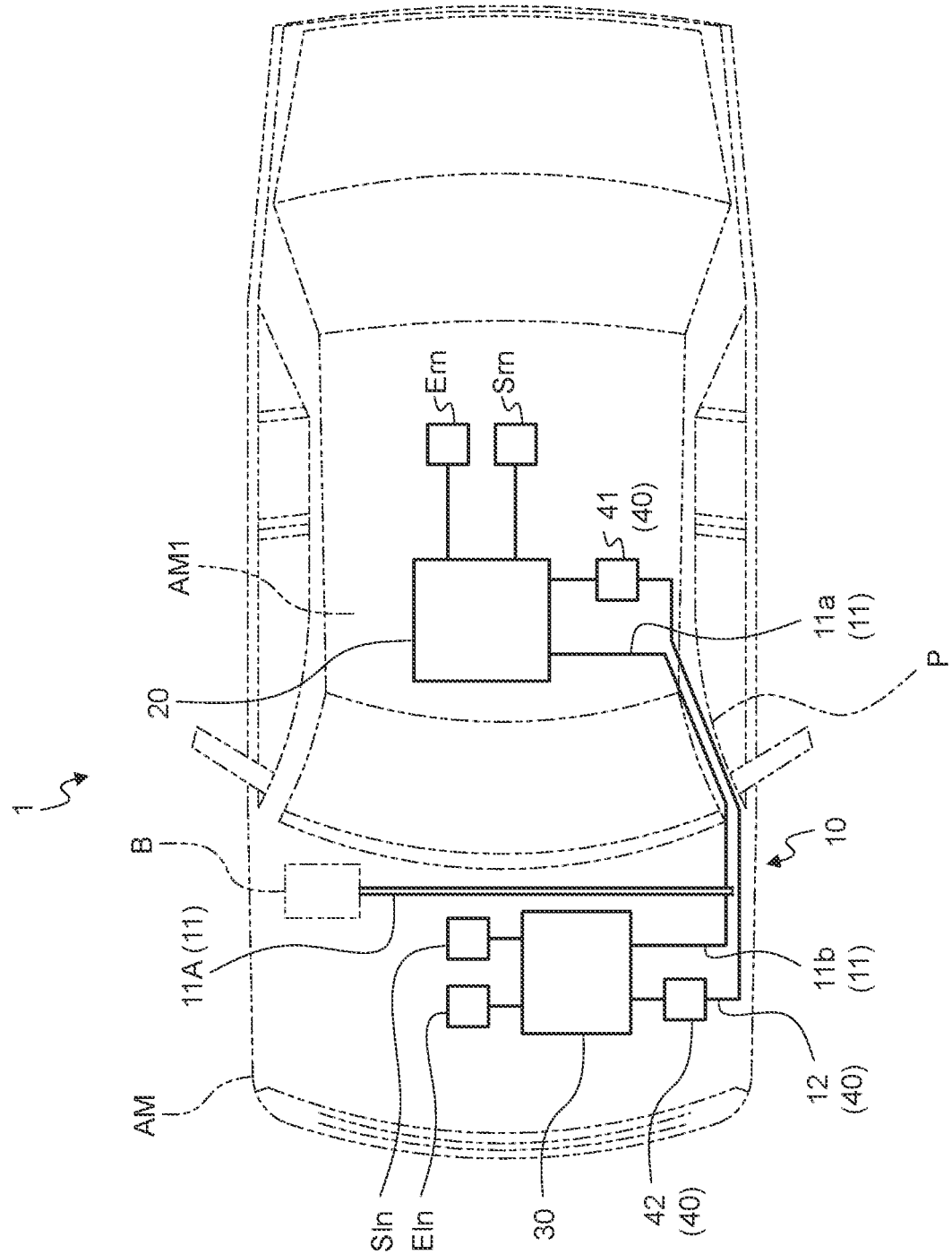
FIG. 1 is a view of an in-vehicle equipment control system according to an embodiment as viewed from the top side of a vehicle.
Figure 2:
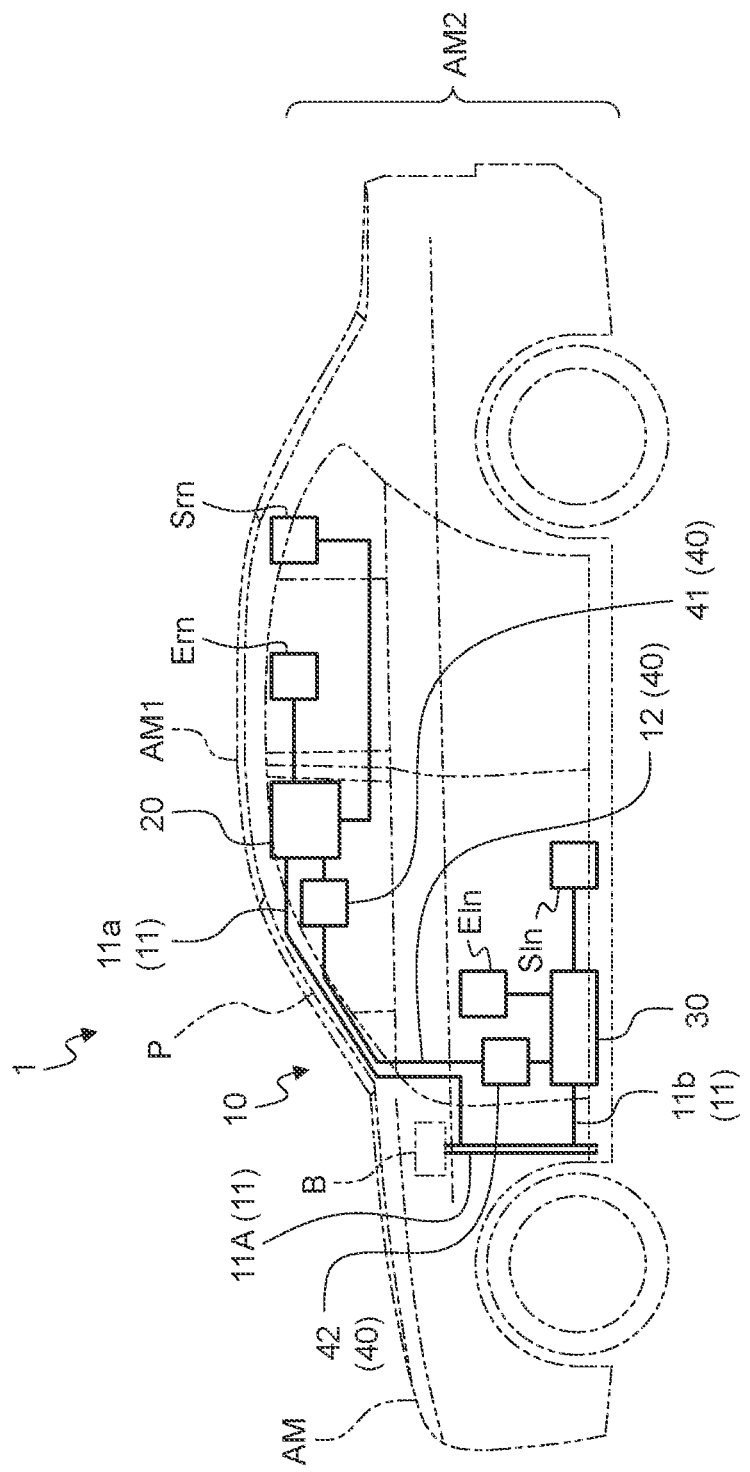
FIG. 2 is a view of the in-vehicle equipment control system according to the embodiment as viewed from the lateral side of the vehicle.
Figure 3:
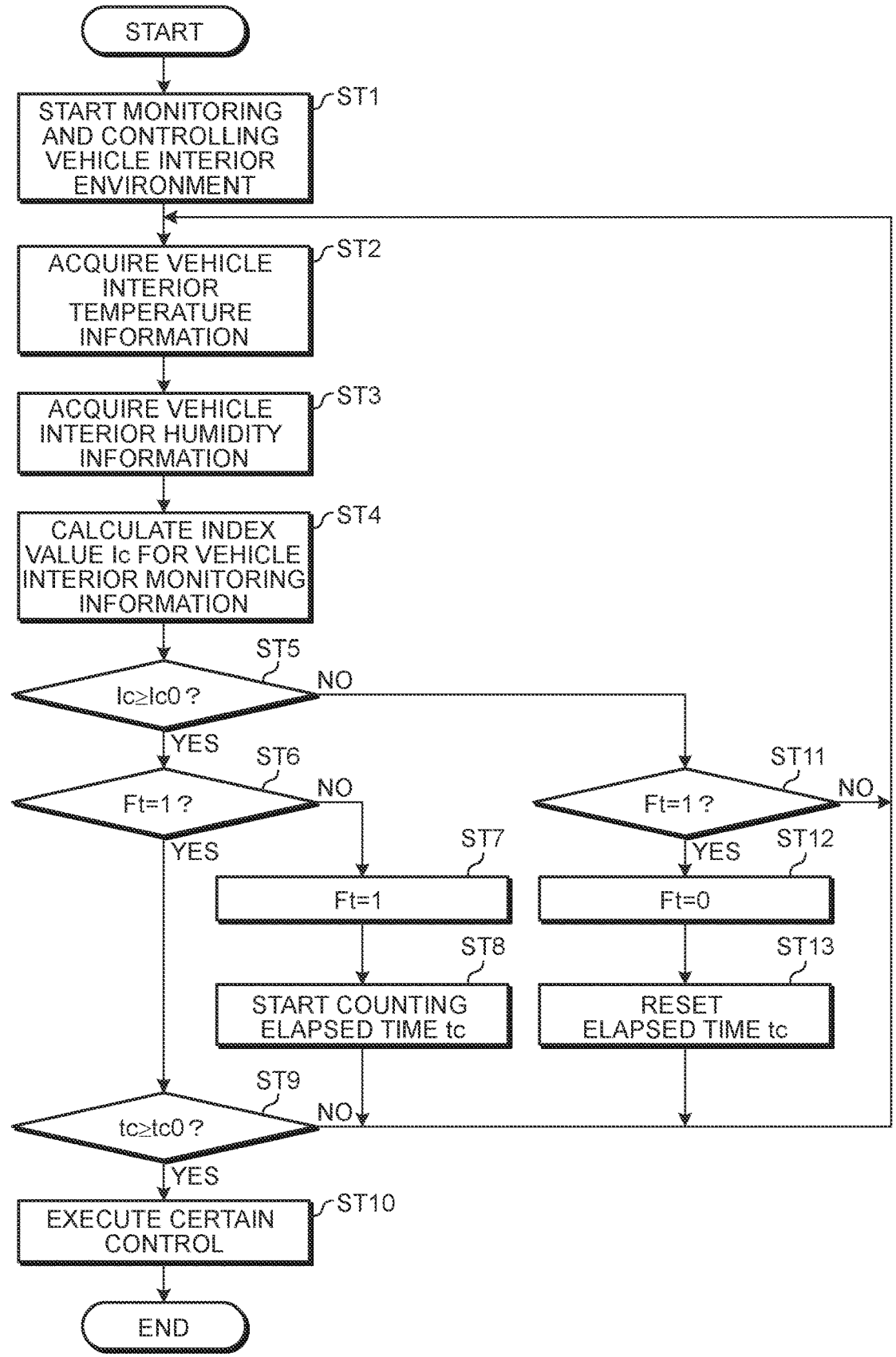
FIG. 3 is a flowchart explaining one specific example, among others, of control in the in-vehicle equipment control system according to the embodiment.

One embodiment, among others, of an in-vehicle equipment control system according to the present invention is described based on FIG. 1 to FIG. 3.

An in-vehicle equipment control system 1 is illustrated in FIG. 1 and FIG. 2. This in-vehicle equipment control system 1 is configured to control at least a plurality of equipment Ern (n=1, 2, 3, ..., m) installed in a ceiling AM1 of a vehicle AM and is installed on the vehicle AM. The in-vehicle equipment control system 1 in this example is configured to control at least two pieces of equipment Ern installed in the ceiling AM1. The equipment Ern may be any kind of equipment that can be installed in the ceiling AM1 and that can be put under operational control (such as operational control necessitated by control on power supply, and operational control corresponding to a command value for a controlled variable). Possible examples of the equipment Ern installed in the ceiling AM1 that can be put under control include a light, an indicator, communication equipment, and a display device. Such pieces of equipment Ern are provided as modules while being housed together in an overhead console, or are installed individually. The in-vehicle equipment control system 1 may additionally control an equipment Eln (n=1, 2, 3, ..., m) installed in a vehicle lower part AM2 that is lower in the vehicle than the ceiling AM1. Possible examples of the equipment Eln in the vehicle lower part AM2 that is controlled include an air conditioner. Hereinafter, the vehicle lower part AM2 denotes a part in the vehicle AM that is lower than the ceiling AM1, the part including, for example, a floor panel, an instrument panel, and an engine compartment. Here, with regard to both of the equipment Ern and the equipment Eln, "n" represents the same natural number, and "m" also represents the same natural number. While this is determined in this manner for the sake of convenience, the total numbers of the pieces of equipment Ern and equipment Eln may be the same or different. Hereinafter, the same principle is applied to denotations using the natural numbers "n" and "m".

This in-vehicle equipment control system 1 includes a wire harness 10 run in the vehicle AM. The vehicle AM has a power supply (such as a secondary battery) B installed in the vehicle lower part AM2. The wire harness 10 is physically and electrically coupled to the power supply B and has a part thereof run from the vehicle lower part AM2 to the ceiling AM1 along a pillar (here, what is called an A-pillar) P. The part of the wire harness 10 is run in an inner space of the pillar P.

This in-vehicle equipment control system 1 includes a control device (hereinafter referred to as "ceiling side controller") 20 installed in the ceiling AM1. The ceiling side controller 20 is configured to control at least the equipment Ern installed in the ceiling AM1 but may be configured to control the equipment Eln installed in the vehicle lower part AM2.

Power from the power supply B is supplied to the ceiling side controller 20 through the wire harness 10 run through the pillar P. The wire harness 10 includes a power supply line 11, through which power output from this power supply B is supplied to components to receive the power, that is physically and electrically coupled to the power supply B. The power supply line 11 has a part thereof run from the vehicle lower part AM2 to the ceiling AM1 along the pillar P, and is physically and electrically coupled to the ceiling side controller 20 in the ceiling AM1. Power from the power supply B is thus supplied to this illustrated ceiling side controller 20 through the power supply line 11 run through the pillar P. The ceiling side controller 20 supplies the power to the equipment Ern put under the control thereof in the ceiling AM1. The ceiling side controller 20 is capable of dividing the power into a plurality of parts, and the respective parts of the power are supplied to the pieces of equipment Ern subject to the control. For example, based on the power, the ceiling side controller 20 generates power suited to the equipment Ern subject to the control. To the equipment Eln in the vehicle lower part AM2, power may be supplied by the ceiling side controller 20. It is desirable, however, that power be supplied thereto, for example, via a control device, such as a lower side controller 30 to be described later, installed in the vehicle lower part AM2.

The power supply line 11 is physically and electrically coupled in the vehicle lower part AM2 to the lower side controller 30 to be described later, thereby being enabled to supply power from the power supply B to this lower side controller 30. For example, this power supply line 11 includes a trunk line 11A coupled to the power supply B, a branch line 11a extended as a branch from this trunk line 11A and coupled to the ceiling side controller 20 and a branch line 11b extended as a branch from the trunk line 11A and coupled to the lower side controller 30.

The ceiling side controller 20 retains information (hereinafter referred to as "ceiling side information") that can be acquired in the ceiling AM1, and controls the equipment Ern and Eln using this ceiling side information. For example, this ceiling side controller 20 retains, as the ceiling side information, at least: detection information (hereinafter referred to as "ceiling side detection information") detected by detection devices (hereinafter referred to as "ceiling side detection devices") Srn (n=1, 2, 3, ..., m) installed in the ceiling AM1; and information (hereinafter referred to as "ceiling side equipment information") on the equipment Ern in the ceiling AM1.

The number of ceiling side detection device Srn installed in the ceiling AM1 is at least one. Possible examples of the ceiling side detection device Srn include a vehicle interior information detection device and a vehicle exterior information detection device. The vehicle interior information detection device is a device that detects information on the interior of a vehicle. As this vehicle interior information detection device, a device capable of detecting the presence and the position of any passenger, the state of any passenger (for example, whether the passenger is awake, and the posture thereof) can be considered, and an image capturing device or a sensor (for example, an infrared sensor) can be used. Otherwise, as this vehicle interior information detection device, a device capable of detecting the interior environment of the vehicle can be considered, and a temperature sensor that detects the interior temperature of the vehicle and a humidity sensor that detects the interior humidity of the vehicle can be used. The vehicle exterior information detection device is a device that detects information on the exterior of a vehicle. As this vehicle exterior information detection device, a device, such as an image capturing device or a laser device, that detects vehicle exterior information on the surroundings (such as other vehicles and passengers) of the vehicle can be used. In this exemplification, communication equipment (a vehicle exterior communication device capable of communicating with the outside of the vehicle) provided as the equipment Ern in the ceiling AM1 may be used as a vehicle interior information detection device in combination with such a device. For example, the communication equipment may be configured to receive vehicle exterior information (for example, weather information) stored in a server or the like outside the vehicle.

The ceiling side controller 20 is capable of receiving, as a signal (hereinafter referred to as "ceiling side information signal") regarding ceiling side information, a signal (hereinafter referred to as "ceiling side detection signal") regarding the ceiling side detection information detected by the ceiling side detection device Srn, directly from the ceiling side detection device Srn without any other control device intermediating therebetween. For example, this ceiling side controller 20 has the ceiling side detection device Srn physically and electrically coupled thereto by an electrical cable (not illustrated), so that the ceiling side detection signal in the ceiling side detection device Srn is transmitted to the ceiling side controller. The ceiling side controller 20 may receive the ceiling side detection signal directly from the ceiling side detection device Srn by wireless communication (irrespective of communication method). The ceiling side controller 20 is also capable of, for example, storing ceiling side detection information in a temporary storage device of its own (not illustrated) or the like, the ceiling side detection information corresponding to the ceiling side detection signal. The ceiling side controller 20 is thus capable of retaining this ceiling side detection information as ceiling side information.

The ceiling side controller 20 is also capable of storing ceiling side equipment information in the temporary storage device of its own or the like. The ceiling side equipment information herein represents, for example, the operational status (such as whether a light is on or off) of the equipment Ern installed in the ceiling AM1 or a setting for a controlled variable applied to the equipment Ern. The equipment Ern is physically and electrically coupled to the ceiling side controller 20 by an electrical cable (not illustrated). The ceiling side controller 20 is thus capable of receiving a signal (hereinafter referred to as "ceiling side equipment information signal") regarding ceiling side equipment information directly from the equipment Ern, and storing this ceiling side equipment information corresponding to this ceiling side equipment information signal in the temporary storage device or the like. The ceiling side equipment information signal may be received directly from the equipment Ern by wireless communication. The ceiling side controller 20 has control information (such as a command value for the controlled variable) previously stored therein for controlling the equipment Ern, and can store this control information as the ceiling side equipment information in the temporary storage device or the like. Thus, the ceiling side controller 20 is capable of retaining this ceiling side detection information as ceiling side information.

The vehicle AM includes at least one control device (hereinafter each referred to as "lower side controller") 30 in the vehicle lower part AM2. This lower side controller 30 installed in the vehicle lower part AM2 may be installed not as a component of the in-vehicle equipment control system 1 or may be installed as a component of the in-vehicle equipment control system 1. The lower side controller 30 in the former case is one provided as a main electronic control unit (ECU), such as an integrated ECU, of the vehicle AM and is configured to have the following functions in addition to a main control function (such as a braking and driving force controlling function or a travel controlling function). In contrast, the lower side controller 30 in the latter case is a component exclusive to the in-vehicle equipment control system 1, and configured to have the following control functions.

The lower side controller 30 retains information (hereinafter referred to as "lower side information") that can be acquired in the vehicle lower part AM2. For example, this lower side controller 30 retains, as the lower-side information, at least: detection information (hereinafter referred to as "lower-side detection information") detected by detection devices (hereinafter referred to as "lower side detection devices") Sln (n=1, 2, 3, . . . , m) installed in the vehicle lower part AM2; and information (hereinafter referred to as "lower side equipment information") on the equipment Eln in the vehicle lower part AM2.

The number of lower side detection device Sln installed in the vehicle lower side AM2 is at least one. Possible examples of the lower side detection device Sln include a subject-vehicle information detection device and a vehicle exterior information detection device. A subject-vehicle information detection device is a device that detects information on a vehicle having the detection device thereon, such as a vehicle speed. Examples of such a subject-vehicle information detection device include an ignition (IG) on/off switch that detects whether the ignition is on or off, and a vehicle speed sensor that detects a vehicle speed. A vehicle exterior information detection device is a device that detects, at a position at which the detection device is installed, vehicle exterior information on the surroundings of a vehicle having the detection device thereon, like the vehicle exterior information detection device provided as the ceiling side detection device Srn. For this reason, a device that can be used as the vehicle exterior information detection device provided as the ceiling side detection device Srn can also be used as this vehicle exterior information detection device.

The lower side detection information is transmitted in the form of a lower side detection signal to the lower side controller 30 from a lower side detection device Sln. This lower side controller 30 is capable of, for example, storing lower side detection information in a temporary storage device of its own (not illustrated) or the like, the lower side detection information corresponding to the lower side detection signal. This lower side controller 30 is thus capable of retaining this lower side detection information as the lower side information.

The lower side controller 30 is also capable of storing lower side equipment information in the temporary storage device of its own or the like. The lower side equipment information herein represents, for example, the operational status (for example, whether an air conditioner is on or off) of the equipment Eln installed in the vehicle lower part AM2 or a controlled variable (for example, a controlled variable for a set temperature for the air conditioner) applied to the equipment Eln. For example, the lower side controller 30 is capable of: receiving a signal (hereinafter referred to as "lower side equipment information signal") regarding the lower side equipment information directly from the equipment Eln by wire or wireless communication; and storing, in the temporary storage device or the like, the lower side equipment information corresponding to this lower side equipment information signal. In addition, the lower side controller 30 has control information (such as a command value for a controlled variable) previously stored therein for controlling the equipment Eln, and can store this control information as the lower side equipment information in the temporary storage device or the like. The lower side controller 30 is also capable of receiving lower side detection information and lower side equipment information from another control device in the vehicle lower part AM2 and storing the received information in the temporary storage device or the like. Thus, the lower side controller 30 is capable of retaining the lower side equipment information as the lower side information.

That lower side information includes information that the ceiling side controller 20 uses when controlling the equipment Ern or Eln. That is, the lower side controller 30 retains an information signal that the ceiling side controller 20 uses when controlling the equipment Ern or Eln. For this reason, in order to enable the information signal to be transmitted to the ceiling side controller 20, the in-vehicle equipment control system 1 includes a communication device (hereinafter referred to as "vehicle internal communication device") 40 that enables information signals to be exchanged between the ceiling side controller 20 and the lower side controller 30. The vehicle internal communication device 40 may be either a wireless communication device or a wired communication device. In this exemplification, the wire harness 10 is run between the ceiling side controller 20 and the lower side controller 30, and the vehicle internal communication device 40 is constructed as a wired device using this wire harness 10.

The vehicle internal communication device 40 includes, for example, a communication line 12 provided in the wire harness 10, a transmitter-receiver 41 provided in the ceiling AM1, and a transmitter-receiver 42 provided in the vehicle lower part AM2. The communication line 12 is a transmission path capable of transmitting an information signal between the vehicle lower part AM2 and the ceiling AM1, and is run therebetween along the pillar P. This communication line 12 may be a line that transmits one information signal. In such a case, the communication line 12 is provided for each information signal. Otherwise, the communication line 12 may be a shared transmission path (what is called a multiplex communication line such as a twisted-pair cable or an optical-fiber cable) that transmits a plurality of information signals. The number of communication lines 12 provided in such a case is at least one. While being coupled to the ceiling side controller 20 via the transmitter-receiver 41 in the ceiling AM1, this communication line 12 is coupled to the lower side controller 30 via the transmitter-receiver 42 in the vehicle lower part AM2.

In this manner, the ceiling side controller 20 is enabled to receive, from the lower side controller 30 via the vehicle internal communication device 40, lower side detection information in the form of a lower side detection information signal regarding the lower side information, the lower side detection information having been detected by the lower side detection device Sln. The ceiling side controller 20 is also enabled to receive, from the lower side controller 30 via the vehicle internal communication device 40, lower side equipment information in the form of a lower side equipment information signal regarding lower side equipment, the lower side equipment information regarding the equipment Eln installed in the vehicle lower part AM2. For example, each time the content of the lower side information to be transmitted to the ceiling side controller 20 is updated, or at certain time intervals, the lower side controller 30 may transmit the lower side information to the ceiling side controller 20. This lower side controller 30 may be configured to, upon reception of a transmission request from the ceiling side controller 20, transmit the lower side information that corresponds to the content of the transmission request to the ceiling side controller 20.

The ceiling side controller 20 uses information to control an equipment Ern or Eln in the ceiling that needs to be controlled, the information being at least one piece of information among at least one piece of ceiling side information and at least one piece of lower side information, the at least one piece of information being needed for controlling the equipment Ern or Eln. For this reason, the ceiling side controller 20 controls the equipment Ern or Eln using only ceiling side information in some cases, controls the equipment Ern or Eln using only lower side information in some other cases, and controls the equipment Ern or Eln using both ceiling side information and lower side information in the other cases. A specific example of such control is described below.

The ceiling AM1 has the ceiling side controller 20, the transmitter-receiver 41 of the vehicle internal communication device 40, the equipment Ern, and the ceiling side detection device Srn arranged therein. These components may be arranged at separate individual positions in the ceiling AM1. Otherwise, the ceiling side controller 20, the transmitter-receiver 41 of the vehicle internal communication device 40, the equipment Ern, and the ceiling side detection device Srn may be installed in a manner such that a modularized unit in which at least two of these components are consolidated on a case, a bracket, or the like by being attached thereto is installed in the ceiling AM1. When these components are installed in this manner, any component that cannot be thus modularized be separately and individually installed in the ceiling AM1.

For example, the ceiling side controller 20 controls a reading light based on an ON signal (the ceiling side information) for a lighting switch for the reading light (the equipment Ern) in the ceiling AM1, information (the ceiling side information) on the state of a passenger seated nearest to the lighting switch, and an ON signal (the lower side information) for headlights (the equipment Eln) in the vehicle lower part AM2. The ceiling side controller 20 operates, for example, to adjust the angle of illumination of the reading light to prevent shadow of the hands of the passenger from being cast therearound. In addition, the ceiling side controller 20 can determine, based on information (the ceiling side information) on the seated position of a passenger and information (the lower side information) on the signal of an alarm switch for a seat belt of a seat occupied by the passenger, whether the seat belt has been worn. If the seat belt has not been worn, the ceiling side controller 20 can alarm the passenger using, for example, an audio device (equipment Eln) and/or an indicator (equipment Eln) in the vehicle lower part AM2.

The following alternative implementation is considered possible. This implementation assumes that a temperature sensor and a humidity sensor are provided as the ceiling side detection devices Srn and that vehicle interior temperature information and vehicle interior humidity information that serve as the ceiling side detection information have been transmitted to the ceiling side controller 20. At least one of the temperature sensor and the humidity sensor may be provided as the lower side detection device Sln. In such a case, the lower side detection information detected thereby is transmitted from the lower side controller 30 to the ceiling side controller 20. In this implementation, the ceiling side controller 20 monitors and controls (hereinafter referred to as "to monitor and control (monitoring and controlling) the vehicle interior environment") the vehicle interior temperature and the vehicle interior humidity using the vehicle interior temperature information and the vehicle interior humidity information are used.

This implementation assumes that a temperature sensor and a humidity sensor are provided as the ceiling side detection devices Srn and that vehicle interior temperature information and vehicle interior humidity information that serve as the ceiling side detection information have been transmitted to the ceiling side controller 20. At least one of the temperature sensor and the humidity sensor may be provided as the lower side detection device Sln. In such a case, the lower side detection information detected thereby is transmitted from the lower side controller 30 to the ceiling side controller 20. In this implementation, the ceiling side controller 20 monitors and controls (hereinafter referred to as "to monitor and control (monitoring and controlling) the vehicle interior environment") the vehicle interior temperature and the vehicle interior humidity using the vehicle interior temperature information and the vehicle interior humidity information.

The ceiling side controller 20 starts monitoring and controlling the vehicle interior environment if a starting condition is satisfied (Step ST1), as illustrated in the flowchart of FIG. 3. The starting condition is a condition under which starting the monitoring and controlling the vehicle interior environment is permitted. The starting condition may be set to any condition, examples of which include: when an ignition signal is an ON signal; when a passenger is detected in the vehicle interior after a certain period of time has passed since detection of a parking brake signal (that is, while the vehicle has been parked); and when a passenger is detected in the vehicle interior after a certain period of time has passed since detection of a parking brake signal and door lock signals for all of the doors (that is, while the vehicle has been parked with all of the doors locked).

After starting the monitoring and controlling the vehicle interior environment, the ceiling side controller 20 acquires the vehicle interior temperature information from the temperature sensor (Step ST2) and acquires the vehicle interior humidity information from the humidity sensor (Step ST3).

Based on the acquired vehicle interior temperature information and vehicle interior humidity information, the ceiling side controller 20 calculates an index value Ic for vehicle interior monitoring information (Step ST4). For example, the index value Ic indicates, when being smaller than a certain threshold Ic0, that the vehicle interior environment is comfortable enough for a passenger to continue staying in the vehicle interior and, when being greater than or equal to the certain threshold Ic0, that the vehicle interior environment is expected to be increasingly uncomfortable if a passenger continues staying in the vehicle interior. For example, the value of what is called Wet Bulb Globe Temperature can be used as this index value Ic. When Wet Bulb Globe Temperature is used, information on radiation heat may be incorporated in advance into a control program for the ceiling side controller 20. The threshold Ic0 may be configured to be changeable by a user of the vehicle AM, such as a passenger thereof, to a desired value.

The ceiling side controller 20 determines whether the index value Ic for the vehicle interior monitoring information is at least the threshold Ic0 (Ic≥Ic0?) (Step ST5).

If the index value Ic is at least the threshold Ic0, the ceiling side controller 20 determines whether a count flag Ft regarding an elapsed time tc is on (Ft=1?) (Step ST6).

If the count flag Ft is off (Ft=0), the ceiling side controller 20 proceeds to Step ST7 to set the count flag Ft on (Ft=1), and then, after starting counting the elapsed time tc at Step ST8, returns to Step ST2.

If the count flag Ft is on (Ft=1), the ceiling side controller 20 determines whether the elapsed time tc is at least a certain time period tc0 (tc≥tc0?) (Step ST9).

If the elapsed time tc is less than the certain time period tc0, the ceiling side controller 20 returns to Step ST2.

If the elapsed time tc is at least the certain time period tc0, the ceiling side controller 20 executes certain control (Step ST10) because the vehicle interior is expected to become increasingly uncomfortable. For example, the ceiling side controller 20 lowers a set temperature for the equipment Eln (an air conditioner in the vehicle interior) in the vehicle lower part AM2, thereby controlling the operation of the air conditioner so as to lower the vehicle interior temperature. In this case, this control makes it possible to prevent the vehicle interior from becoming increasingly uncomfortable. The ceiling side controller 20 may control the equipment Eln (such as an audio device or an indicator) in the vehicle lower part AM2 to alert a passenger in the vehicle that the vehicle interior is expected to become increasingly uncomfortable. In this case, this control prompts the passenger to lower the set temperature for the air conditioner, thereby making it possible to prevent the vehicle interior from becoming increasingly uncomfortable in this case. Otherwise, in the case where the vehicle is a camping vehicle or the like with which some passengers perform activities in the vehicle interior while the others perform activities outside the vehicle, the ceiling side controller 20 controls communication equipment provided as the equipment Ern in the ceiling AM1 to transmit information to a mobile communication terminal or the like of a specified passenger who is outside the vehicle, the information indicating that the vehicle interior is expected to become increasingly uncomfortable. In this case, this control prompts the passenger to lower the set temperature for the air conditioner by informing the information of another passenger in the vehicle interior or returning to the vehicle interior, thereby making it possible to prevent the vehicle interior from becoming increasingly uncomfortable. Together with the foregoing information, positional information on the vehicle AM may be transmitted to the mobile communication terminal.

If the index value Ic is smaller than the threshold c0 at Step ST5, the ceiling side controller 20 determines whether the count flag Ft regarding the elapsed time tc is on (Ft=1?) (Step ST11).

If the count flag Ft is off (Ft=0) at Step ST11, the ceiling side controller 20 returns to Step ST2.

If the count flag Ft is on (Ft=1) at Step ST11, the ceiling side controller 20 proceeds to Step ST12 to set the count flag Ft off (Ft=0), and then, after resetting the elapsed time tc at Step ST13, returns to Step ST2.

While the determination based on comparison between the index value Ic and the threshold Ic0 is illustrated here, the determination may be based additionally on the rate of change, such as the rate of increase, of the index value Ic.

As described above, the in-vehicle equipment control system 1 according to the present embodiment is configured to have a control device (the ceiling side controller 20) arranged in the ceiling AM1 and enable the lower side information retained by the lower side controller 30 in the vehicle lower part AM2 to be transmitted to this ceiling side controller 20. This in-vehicle equipment control system 1 is further configured to enable the ceiling side controller 20 to use information to control equipment Ern in the ceiling AM1 that needs to be controlled, the information being at least one piece of information among at least one piece of ceiling side information and at least one piece of lower side information, the at least one piece of information being needed for controlling the equipment Ern. This in-vehicle equipment control system 1 can thus generate control signals in the ceiling side controller 20 in the ceiling AM1 without sending the ceiling side information down to the lower side controller 30 when controlling the equipment Ern in the ceiling AM1. Therefore, this in-vehicle equipment control system 1 involves less information exchange between the ceiling AM1 and the vehicle lower part AM2 than in a conventional case, thus enabling simplified control over the equipment Ern installed in the ceiling AM1.

Moreover, the in-vehicle equipment control system 1 according to the present embodiment is configured to be able to have the equipment Eln in the vehicle lower part AM2 controlled by the ceiling side controller 20 in the ceiling AM1. This in-vehicle equipment control system 1 thus can reduce a load on the lower side controller 30 for arithmetic processing.

In this in-vehicle equipment control system 1, when the lower side controller 30 controls an equipment Eln in the vehicle lower part AM2, the ceiling side controller 20 additionally can transmit to the lower side controller 30, via the vehicle internal communication device 40, the ceiling side information that is needed for the control. For example, when multiple kinds of lower side information are used for controlling an equipment Eln in the vehicle lower part AM2, all of those kinds of lower side information need to be transmitted to the ceiling side controller 20 in order for the ceiling side controller 20 to control the equipment Eln. Kinds of ceiling side information needed for the control might be smaller in number than the kinds of lower side information. Therefore, for example, if the kinds of lower side information needed for controlling the equipment Eln in the vehicle lower part AM2 are larger in number than the kinds of ceiling side information needed therefor, the ceiling side controller 20 transmits to the lower side controller 30, via the vehicle internal communication device 40, ceiling side information needed for the control. In this manner, this in-vehicle equipment control system 1 enables simplified control, and enables arithmetic processing loads to be reduced both on the ceiling side controller 20 and on the lower side controller 30.

An in-vehicle equipment control system according to the embodiments has a ceiling side controller installed in the ceiling and is configured to transmit, to the ceiling side controller, lower side information retained by a lower side controller in the lower part of the vehicle. This in-vehicle equipment control system is further configured to enable the ceiling side controller to use information to control an equipment in the ceiling that needs to be controlled, the information being at least one piece of information among at least one piece of ceiling side information and at least one piece of lower side information, the at least one piece of information being needed for controlling the equipment. This in-vehicle equipment control system can thus generate control signals in the ceiling side controller without sending the ceiling side information down to the lower side controller when controlling equipment in the ceiling. Therefore, this in-vehicle equipment control system involves less information exchange between the ceiling and the vehicle lower part than in a conventional case, thus enabling simplified control over equipment installed in the ceiling.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle equipment control system comprising:
   a ceiling side controller installed in a ceiling of a vehicle and configured to control an equipment provided at least to the ceiling; and
   a vehicle internal communication device configured to enable the ceiling side controller and a lower side controller to transmit and receive information signals to and from each other, the lower side controller having been installed in a lower side of the vehicle than the ceiling of the vehicle,
   wherein the ceiling side controller is
      configured to receive ceiling side detection signals regarding pieces of ceiling side detection information detected by at least one ceiling side detection device in the ceiling, as ceiling side information signals regarding pieces of ceiling side information, from the at least one ceiling side detection device, and
      configured to receive, from the lower side controller, lower side detection information detected by at least one lower side detection device in the lower side of the vehicle, as lower side information signals regarding pieces of lower side information, from the at least one lower side detection device via the vehicle internal communication device, and
   wherein the ceiling side controller is configured to control the equipment using only at least one of the pieces of lower side information in some cases, and using both at least one of the pieces of ceiling side information and at least one of the pieces of lower side information in other cases,
   the lower side controller is configured to transmit the lower side information to the ceiling side controller at an occurrence of a predetermined event, the predetermined event includes any one of each time a content of the lower side information to be transmitted to the ceiling side controller is updated, and at certain predetermined time intervals, and
   the lower side controller is configured to, upon reception of a transmission request from the ceiling side controller, transmit the lower side information that corresponds to a content of the transmission request to the ceiling side controller.

2. The in-vehicle equipment control system according to claim 1, wherein the ceiling side controller controls a reading light that is the equipment provided at the ceiling based on a piece of information concerning the reading light as the ceiling side information and a piece of information concerning a headlight in the lower side of the vehicle as the lower side information.

3. The in-vehicle equipment control system according to claim 1, wherein
the ceiling side controller is
configured to retain, as one of the pieces of ceiling side information, a piece of ceiling side equipment information regarding at least one of equipment that has been installed in the ceiling and
configured to receive lower side equipment information regarding at least one of equipment that has been installed in the lower part of the vehicle, as one of the lower side information signals regarding the pieces of lower side information, from the lower side controller via the vehicle internal communication device.

4. The in-vehicle equipment control system according to claim 3, wherein
when the lower side controller controls any one of the at least one equipment that has been installed in the lower side of the vehicle, the ceiling side controller transmits any one piece of the pieces of ceiling side information to the lower side controller via the vehicle internal communication device, the one piece of ceiling side information being needed for the control.

5. The in-vehicle equipment control system according to claim 1, wherein
when the lower side controller controls any one of the at least one equipment that has been installed in the lower side of the vehicle, the ceiling side controller transmits any one piece of the pieces of ceiling side information to the lower side controller via the vehicle internal communication device, the one piece of ceiling side information being needed for the control.

6. The in-vehicle equipment control system according to claim 5, wherein
the ceiling side controller determines, based on a piece of information on a seated position of a passenger as the ceiling side information and a piece of information on a signal of an alarm switch for a seat belt of a seat occupied by the passenger as the lower side information, whether the seat belt has been worn, and if the seat belt has not been worn, the ceiling side controller alarms the passenger using the equipment that has been installed in the lower side of the vehicle.

7. The in-vehicle equipment control system according to claim 5, wherein
at least one of a temperature sensor and a humidity sensor is provided as the lower side detection device, a piece of vehicle interior temperature information or a piece of vehicle interior humidity information that serve as the lower side detection information is transmitted from the lower side controller to the ceiling side controller, and the ceiling side controller monitors and controls a vehicle interior temperature and a vehicle interior humidity using the piece of vehicle interior temperature information or the piece of vehicle interior humidity information.

* * * * *